Dec. 19, 1967            L. WEICKHARDT          3,358,784
PRECISION WEIGH SCALES WITH COMMONLY-CONTROLLED
TARING AND ZEROIZING MEANS
Filed July 20, 1965
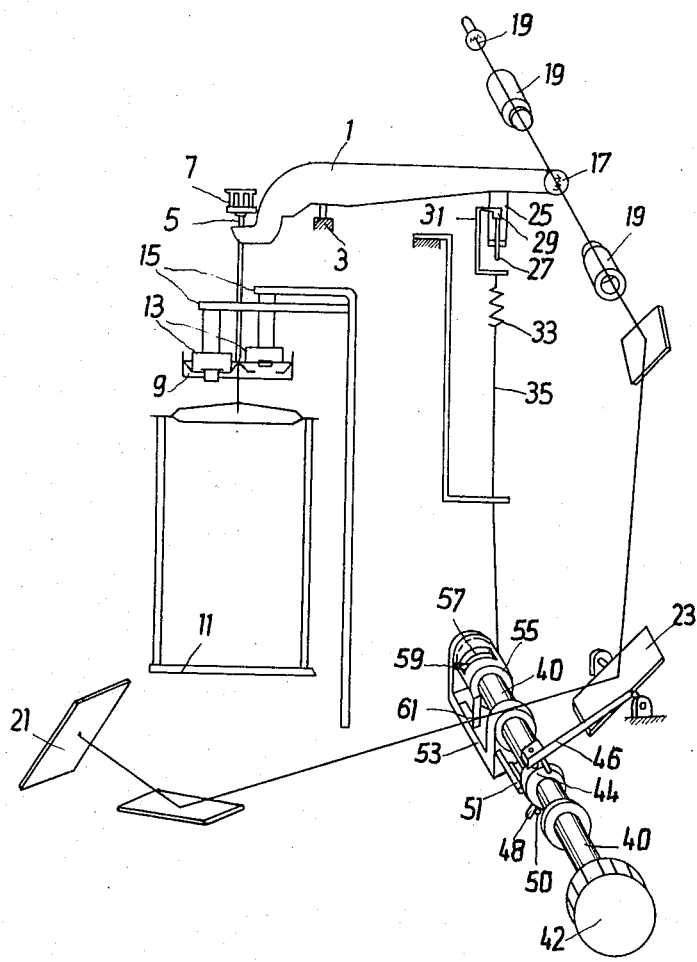
Inventor:
LUDWIG WEICKHARDT
By *Linton and Linton*
ATTORNEYS

United States Patent Office 3,358,784
Patented Dec. 19, 1967

3,358,784
PRECISION WEIGH SCALES WITH COMMON-
LY-CONTROLLED TARING AND ZERO-
IZING MEANS
Ludwig Weickhardt, Gottingen, Germany, assignor to Sartorius-Werke (und vormals Gottinger Prazisions-waagenfabrik G.m.b.H.) Aktiengesellschaft, Gottingen, Germany
Filed July 20, 1965, Ser. No. 473,338
Claims priority, application Germany, Aug. 8, 1964,
S 49,740
7 Claims. (Cl. 177—169)

This invention relates to high-precision scales which are provided with a tare compensating device, in which the stress of a spring opposing the deflection of the scale beam is variable by the adjustment of a member which will be described as a stressing member. The balance has also a high-precison optical indicator, which comprises a ray displacing member, which serves for setting the zero position and is disposed in the path of rays of said indicator and adjustable by a member which will be described as a deflecting member.

The deflection of the scale beam under the action of the tare is compensated in that the tare compensating device imparts a correspondingly high stress to the spring. The net weight is subsequently determined against the action of the resulting spring bias.

In high-precision scales, the zero position depends, among other factors, on temperature and the humidity of the environmental atmosphere. The zero setting device enables a re-adjustment of the zero position before each weighing. The ray displacing member consists usually of the last mirror or the last but one mirror in the path of the light rays which transmit the high-precision indication.

In known scales of the kind described first hereinbefore, the zero setting device is disposed separately from the tare compensating device. Thus, the operator can perform a plurality of weighing operations without changing the zero position. This may result in weighing errors if a necessary change of the zero position due to atmospheric disturbances is not taken into account.

As contrasted therewith, the invention resides in that in scales of the kind defined first hereinbefore the deflecting member is adjustable between two stationary stops (hereinafter described as "deflecting member stops") and and is operatively connected by a friction coupling to a positioning member, the stressing member is under the action of a friction brake, and the stressing member and the positioning member are provided with associated stops (hereinafter described as "stressing member stops") on both sides of a free adjusting range of the positioning member, which range corresponds to the adjusting range of the deflecting member between the deflecting member stops.

Thus, the operator cannot independently adjust the stressing member of the tare compensating device but must first adjust the deflecting member of the zero setting device so that the zero position is changed. When the deflecting member has reached the end of its adjusting range, the stressing member is carried along against the action of the friction brake and is adjusted until the tare is approximately compensated. As the adjustment of the stressing member is too coarse for an exact compensation, the fine tare compensation is effected by the zero setting device. For this purpose, the operator adjusts the stressing member in the original direction of rotation somewhat beyond the point where a compensation is effected (he would do so unconsciously in attempting to achieve a compensation) whereafter the deflecting member is moved in the reverse direction so that the stop which previously carried the stressing member along is rendered ineffective. The operator moves only the deflecting member in a reverse direction until the fine graduations of the scale have been set to zero. This is not effected as a separate zero setting operation but in conjunction with the fine tare adjustment. As a result, the zero setting operation cannot be forgotten. The scales are now ready for the subsequent determination of the net weight.

Because the deflecting member is adjustable between two stationary stops, the same adjusting range of the deflecting member is always available for the adjustment of the ray displacing member, irrespective of the position of the stressing member. The deflecting member is adjustable within this range without affecting the stressing member. The friction coupling ensures that the deflecting member will be carried along by the positioning member within this range. The positioning member can be moved further beyond the stops due to the friction coupling. The stressing member is caused to follow said movement by the stressing member stops.

The friction coupling will carry the deflecting member along whenever the positioning member is moved in a reverse direction after an adjustment of the stressing member. In this case one stressing member stop and one stationary deflecting member stop will be disengaged at the same time. During a movement of the positioning member in its free adjusting range between the stressing member stops, the deflecting member is carried along to correct the zero position. This arrangement ensures that the deflecting member will always be in a defined initial position when the positioning member is moved in a reverse position after an adjustment of the stressing member. This applies to both directions of movement of the stressing member, namely, for stressing and for relaxing the tare compensating spring.

The adjusting range between the deflecting member stops is preferably smaller than the adjusting range between the stressing member stops. When the operator has moved the deflecting member throughout its adjusting range, one of the deflecting member stops and with it the slip coupling will become operative. At this time, the operator feels an increased resistance, which indicates that the adjustment of the deflecting member and with it the fine adjustment has been terminated and that a further adjustment in the same direction will carry the stressing member along. The operator may terminate the adjusting movement in time if such movement of the stressing member is to be avoided.

In a development of the invention, the positioning member may comprise a rotatable shaft, the stressing member may comprise a winding drum, the stressing and deflecting members being coaxial with and rotatable relative to the shaft and the friction coupling being mounted on the shaft. This enables the use of rotational movements and rotatable parts affording a high accuracy.

An embodiment of the invention will now be described by way of example with reference to the accompanying drawing.

The scale beam 1 rests with its main knife edge on a stationary bearing 3. At its end knife edge 5, the scale beam carries the hanger 7 with a weight basket 9 and a load pan 11. Lifting rods 15 are provided for lifting the range weights 13. The means for operating these rods are not shown.

A series of micro graduations 17 are provided at the free end of the beam. A portion of these graduations is projected by a projecting system 19 and a plurality of mirrors onto a ground glass screen 21. One of the mirrors, here the last but one mirror 23, is pivotally mounted and serves as a ray displacing member for correcting the zero position.

The longer arm of the beam carries a point holder 25, in which a point 27 is vertically adjustably mounted. The point carries a bearing block 29, which has a conical recess and constitutes a part of a spring shackle 31. The latter carries the tare compensating spring 33, which is thus rotatably mounted on the point 27. A chain 35 or a belt is attached to the lower end of the tare compensating spring and extends through a bore of a fixed guide 37 for determining the direction in which tension is applied by the spring. This ensures that tension applied to the spring 33 will always be in the same, vertical direction.

The shaft 40 for operating the combined tare compensating and zero setting device carries a rotary knob 42 and a deflecting member consisting of a camwheel 44 having a very small rise. The camwheel 44 is rotatably mounted on the shaft 40 and is operatively connected to it by a friction coupling, which is not shown. The camwheel acts on an arm 46 for pivotally moving the mirror 23. The angular movement of the camwheel 44 is limited by a pin 48, which is carried by the camwheel and movable between two stationary stop pins 50 and 51.

The shaft 40 is rotatably mounted in a bearing bracket 53. The stressing member consisting of a drum 55 is rotatably mounted on the shaft 40 within the bearing bracket. The stressing member has a milled slot 57, through which a stop pin 59 extends, which is radially secured in the shaft 40.

With the aid of the drum 55, the chain 35 can be wound up to a larger or smaller extent so that a higher or lower stress is imparted to the tare compensating spring. The entire winding range is preferably within the order of one complete revolution. The additional free range of rotational movement of the shaft 40 for rotating the camwheel 44 is preferably of the order of one half of a revolution.

The bearing bracket 53 carries the friction brake which acts on the drum 55 and consists in the present case of a laterally bent leaf spring 61. The free end of this spring bears on the end face of the drum 55. The contact pressure is determined so that the friction torque exerted on the drum is higher than the maximum torque of the friction coupling which co-operates with the camwheel 44. Spring discs or a compression spring may be used instead of the angled leaf spring 61.

When a tare is applied to the pan 11 with the parts in the position shown, the long arm of the scale beam will swing upwardly. When the shaft 40 is then rotated in the clockwise sense, the pin 59 will initially move freely in the milled slot 57 until it engages the right-hand end of this slot. The camwheel 44 is caused to follow this rotation by the friction coupling. This is without significance at this stage. A further rotation of the shaft 40 will be transmitted to the drum so that the chain 35 is wound up. As a result, the stress of the tare compensating spring 33 is increased so that the long arm of the beam is lowered. During the rotation of the drum 55, that portion of the micro graduations 17 which is projected on the ground glass screen 21 approaches the zero position. The operator need not effect an exact adjustment of this position with the aid of the drum 55. It is sufficient to effect a movement slightly beyond the zero position. When the shaft 40 is then rotated to some extent in the reverse direction, the drum 55 will remain at a standstill under the influence of the friction brake 61. During the winding operation, the pin 48 of the camwheel 44 has engaged the stationary pin 51. By means of the friction coupling, the camwheel 44 is caused to follow the rotation in the reverse direction so that the mirror 23 is adjusted and the zero position is set. In this operation, the shaft 40 may be rotated in the forward and reverse directions about the zero position without affecting the position of the drum 55 because the pin 59 moves freely within the milled slot 57. The tare weight is now compensated and the zero position has been corrected.

When the weighing operation has been terminated and the initial stress imparted to the tare compensating spring is to be removed, the shaft is rotated in the counterclockwise sense until the pin 59 engages the left-hand end of the milled slot in the drum 55 and then carries the latter along. The shaft is now rotated slightly beyond the zero position. The shaft 40 is then rotated back in the counterclockwise sense so that the zero position is set by the camwheel 44 and the mirror 23.

What is claimed is:

1. High-precision scales, comprising a load receiving member, load-responsive means positively connected to said load receiving member, a tare compensating spring biasing said load-responsive means, an adjustable stressing member for varying the initial stress of said spring, a friction brake constantly acting on said stressing member, weight indicating means responsive to said load-responsive means and having an adjustable zero position, a zero setting member operable to adjust said zero position, a positioning member frictionally connected to said zero setting member, a frame carrying said load receiving member, load-responsive means, spring, stressing member, brake, weight indicating means, zero setting member and positioning member, two stationary stops carried by said frame and arranged to limit the adjustment of said zero setting member, said positioning member being movable through an adjusting range including a zero setting range within which said positioning member is operable to move said zero setting member, and coupling means arranged to positively couple said positioning and stressing members when said positioning member is in predetermined positions of said adjusting range on opposite sides of said zero setting range.

2. High-precision scales as set forth in claim 1, in which said adjusting range is larger than said zero setting range.

3. High-precision scales as set forth in claim 1, in which the friction torque of said friction brake is higher than the maximum torque which can be transmitted between said positioning member and said zero setting member.

4. High-precision scales as set forth in claim 1, in which said positioning member comprises a rotatable shaft, frictionally connected to said zero setting member, said stressing member comprises a winding drum, said stressing member and zero setting member are coaxial with and rotatable relative to said shaft.

5. High-precision scales as set forth in claim 1, in which said coupling means comprise stops carried by said stressing member and positioning member and arranged to interengage in said predetermined positions.

6. High-precision scales as set forth in claim 1, in which said load-responsive means comprise a pivoted scale beam and said spring is arranged to oppose the pivotal movement of said beam in response to a load.

7. High-precision scales as set forth in claim 1, in which said weight-indicating means comprise optical means defining a path of light rays and said zero setting means include an optically active member which is adjustable to displace said light rays and operatively connected to said zero setting member.

References Cited

UNITED STATES PATENTS

| | | | |
|---|---|---|---|
| 2,352,906 | 7/1944 | Lyons | 177—168 |
| 2,662,762 | 12/1953 | Meinig | 177—178 |
| 2,993,547 | 7/1961 | Richardson | 177—168 |
| 3,009,523 | 11/1961 | Williams | 177—168 |

ROBERT S. WARD, JR., *Primary Examiner.*